United States Patent [19]

Yamamoto et al.

[11] Patent Number: 5,151,813
[45] Date of Patent: Sep. 29, 1992

[54] METHOD AND APPARATUS FOR PRODUCING THREE-DIMENSIONAL OBJECTS

[75] Inventors: Masanobu Yamamoto, Kanagawa; Kazumine Itoh, Tokyo, both of Japan

[73] Assignee: Sony Corporation, Tokyo, Japan

[21] Appl. No.: 492,607

[22] Filed: Mar. 12, 1990

[30] Foreign Application Priority Data

Mar. 14, 1989 [JP] Japan .................................. 1-61422

[51] Int. Cl.⁵ ...................... G02B 26/08; G11C 13/00; B29C 35/08
[52] U.S. Cl. ................................. 359/202; 359/900; 365/119; 264/22
[58] Field of Search ............................. 350/6.1–6.91; 365/119, 120; 340/700, 795, 811; 358/113, 302; 364/518–522; 264/22–25, 230, 255, 308; 427/44, 53.1, 264, 265; 425/112, 174.4; 359/196–228, 32, 227–236, 900

[56] References Cited

U.S. PATENT DOCUMENTS

| | | | |
|---|---|---|---|
| 4,041,476 | 8/1977 | Swainson | 365/119 |
| 4,575,330 | 3/1986 | Hull | 365/119 |
| 4,961,154 | 10/1990 | Pomerantz et al. | 364/522 |
| 5,009,585 | 4/1991 | Hirano et al. | 264/22 |
| 5,011,635 | 4/1991 | Murphy et al. | 264/22 |
| 5,015,424 | 5/1991 | Smalley | 264/22 |

FOREIGN PATENT DOCUMENTS

0250121A2 12/1987 European Pat. Off. .
113925 4/1990 Japan .

*Primary Examiner*—Bruce Y. Arnold
*Assistant Examiner*—Thong Nguyen
*Attorney, Agent, or Firm*—Philip M. Shaw, Jr.

[57] ABSTRACT

A three-dimensional object producing method, and the apparatus for carrying it out, of the type in which a beam is irradiated on a liquid surface of a liquid photo-curable resin to form a succession of cured resin layers corresponding to successive cross-sectional laminae of the three-dimensional object and step-wise moving the cured resin layers as they are formed to build up a three-dimensional copy of object, wherein the improvement of the method comprises vector-scanning the beam on a first layer of photo-curable resin along one or more paths corresponding to the contour or contours of a first one of the cross-sectional laminae of the object, thereafter, raster-scanning the beam on one or more layers of photo-curable resin which are subsequent to the first layer of photo-curable resin, and alternating repeating these different scanning steps until a complete copy of the object is thereby produced.

8 Claims, 9 Drawing Sheets

METHOD AND APPARATUS FOR PRODUCING THREE-DIMENSIONAL OBJECTS

BACKGROUND OF THE INVENTION

1. Field of the Invention

The present invention relates generally to a method and apparatus for producing a three-dimensional object in which an exposure beam is irradiated on a liquid photo-curable resin to produce a three-dimensional object on the basis of a desired three-dimensional object image. More particularly, this invention relates to a method and apparatus for producing a three-dimensional object in which a liquid surface of a liquid photo-curable resin is exposed in response to the shapes of planes exploded from a certain direction of a three-dimensional object image to thereby form a cured resin layer and in which the cured resin layer is sequentially laminated, thereby a three-dimensional object being formed. Furthermore, the present invention relates to a method and apparatus for producing a three-dimensional object in which a scanning of beam on the liquid surface of a liquid photo-curable resin is performed by switching between two kinds of scanning systems to thereby produce a three-dimensional object whose surface is smooth, and in which a three-dimensional object can be produced at high speed.

2. Description of the Prior Art

In the prior art, it is proposed to produce a product of a desired shape by irradiating a liquid photo-curable resin with a predetermined exposure beam. For example, U.S. Pat. No. 4,041,476 and Japanese Patent Application No. 63-267945 describe such a previously-proposed method.

Figure 1:
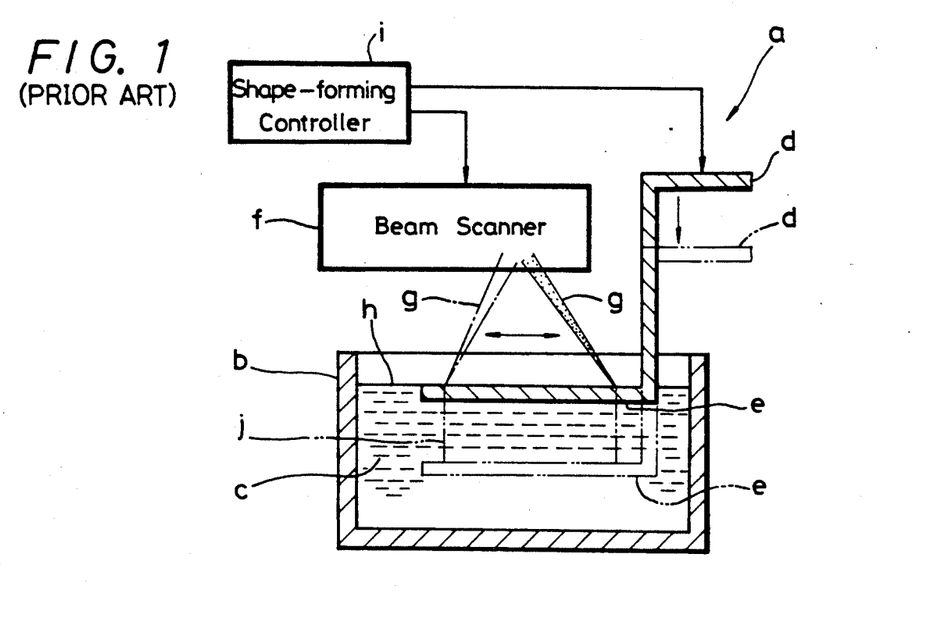
FIG. 1 is a diagrammatic view of a section of an example of an apparatus which embodies a prior art method for producing a three-dimensional object.

FIG. 1 shows an example of a three-dimensional object producing apparatus a which embodies the above-described method.

It will be seen in FIG. 1 that a resin storage tank b is provided to store therein a liquid photo-curable resin c which is cured by the radiation of a predetermined exposure beam, for example, ultra-violet (UV) rays. An elevator d is provided with a horizontal, plate-shaped stage e, and this elevator d is moved up and down by some suitable moving means (not shown). A beam scanner f is located above the resin storage tank b and allows an exposure beam g to be converged on a liquid surface h of the liquid photo-curable resin c. A shape-forming controller i is provided, and the scanning of the exposure beam g is performed on the liquid surface h by the beam scanner f under the control of the controller i and the movement of the elevator d is also performed under the control of the controller i.

When forming a predetermined three-dimensional object, at first, the elevator d is moved to the initial position, as shown by a solid line in FIG. 1, such that the liquid photo-curable resin c of a predetermined thickness (this thickness will be described more fully later) is located on the stage e of the elevator d.

The scanning of the exposure beam g on the liquid surface h is performed next. In this scanning-process, a so-called raster scanning is performed with patterns corresponding to planes in which a desired three-dimensional object image j is exploded into a number of planes in a certain direction thereof. In the following description, the respective planes will be referred to as exploded planes.

When the scanning of beam g is carried out, the liquid photo-curable resin c is cured at a portion thereof irradiated with the beam g to produce one sheet-shaped cured-resin layer having a configuration corresponding to that of the exploded plane of the liquid surface h. The elevator d is moved downwards at a pitch corresponding to the exploded pitch in which the three-dimensional object image j is exploded into a number of exploded planes in a certain direction each time one sheet-shaped cured-resin layer is formed completely. The thickness of the liquid photo-curable resin c on the stage e in the initial state is selected to be equal to the above-described pitch. Accordingly, the liquid photo-curable resin of the thickness corresponding to one pitch amount flows to the upper surface of the cured-resin layer, and the scanning of beam is performed on the next exploded plane to thereby form other cured-resin layer. At that time, the above-described cured-resin layer is bonded to the former cured-resin layer. In this manner, a new cured-resin layer k is sequentially laminated on the cured-resin layer formed, and a desired three-dimensional object is formed by a number of laminated cured-resin layers.

According to the method for producing a three-dimensional object as described above, the three-dimensional object can be produced on the basis of the desired three-dimensional object image so that, as compared with a prior-art method for producing a three-dimensional object by utilizing a metal mold, a three-dimensional object can be readily produced as an experiment. Therefore, the development from the design stage to the mass-production stage can be readily carried out at low cost.

In the above-mentioned three dimensional object producing method, if the scanning of the exposure beam is performed according to the raster-scanning system, there arises the problem that the surface of the three-dimensional object formed is given irregularities.

Figure 2:
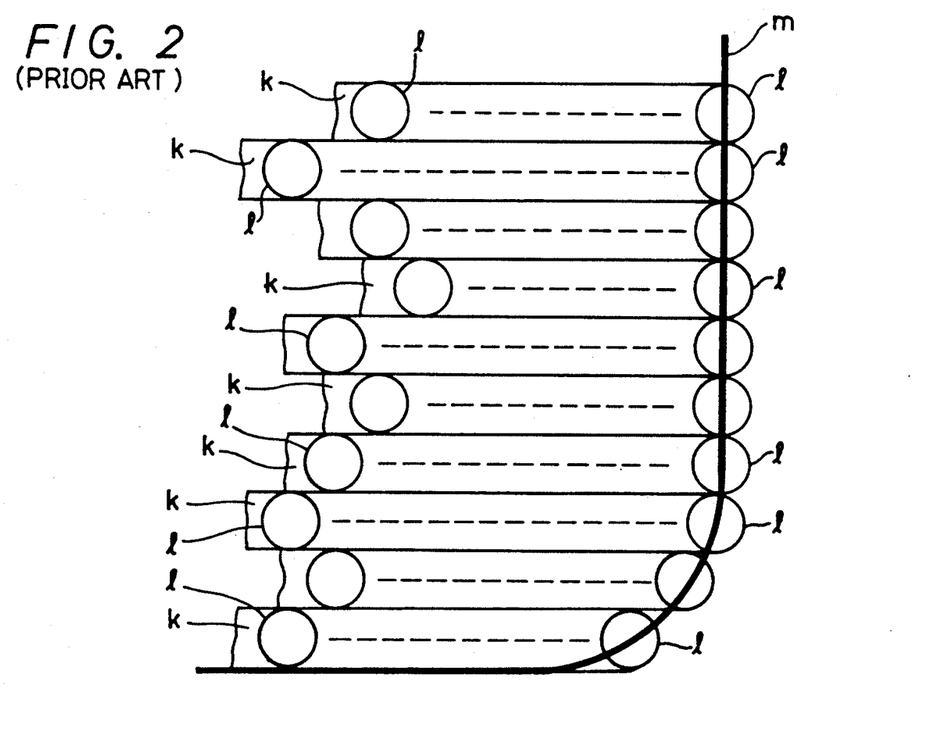
FIG. 2 is a schematic plan view to which reference will be made in explaining defects inherent in the prior-art method for producing a three-dimensional object.

FIG. 2 is a plan view conceptually illustrating one portion of the locus in which a scanning of the exposure beam is performed on a certain exploded plane. In FIG. 2, reference letters k, k, . . . designate main scanning lines of the exposure beam g, i.e., lines along which beam spots l, l, . . . are moved and reference letter m represents the configuration line of the corresponding exploded plane.

As is clear from FIG. 2, of the outer configuration of the cured-resin layer formed, on the portion extended in the direction perpendicular to the main scanning direction of the beam there appears one portion of each of the shapes of the end beam spots l, l, . . . of the beam main scanning lines k, k, . . . , which presents the irregular (i.e., concaved and convexed) configuration line on the above portion. Consequently, the surface of the three-dimensional object image formed by the collection of irregular configuration lines are caused to take very small concavities and convexities.

In addition to the above-described raster-scanning system, a so-called vector scanning system is known as one of the beam scanning systems. In this vector scanning system, a straight line-shaped main scanning direction is not provided uniquely but the scanning is performed while the scanning direction is being changed to the direction corresponding to vector data. This vector scanning system is frequently utilized, for example, by a picture drawing system which employs a polygon mirror and a movable picture drawing table or a picture drawing system which employs a so-called X-Y photo plotter.

Accordingly, if the scanning of the exposure beam 8 in this kind of the three-dimensional object producing method is performed according to the vector scanning system, then the configuration of the exploded plane can be drawn by lines formed of continuous beam spots moving in accordance with the extended direction of the configuration lines, i.e., lines having a directivity in the two-dimension. Therefore, it is possible to obtain a three-dimensional object whose surface is smooth.

However, in this method of producing a three-dimensional object, if the scanning of the exposure beam is carried out according to the vector scanning system, the vector-scan has the directivity in the two-dimensions so that, so long as the configuration line of the exploded plane is not a straight line, the directions of the beam spots must successively be changed to many directions, which needs plenty of time for scanning the plane of the same area as compared with the above-described raster scanning system.

OBJECTS AND SUMMARY OF THE INVENTION

Therefore, it is a general object of the present invention to provide an improved method and apparatus for producing a three-dimensional object in which the above-described defects encountered with the prior art can be eliminated.

More specifically, it is an object of the present invention to provide a method and apparatus of producing a three-dimensional object in which a three-dimensional object with a very smooth surface can be obtained.

It is another object of the present invention to provide a method and apparatus for producing a three-dimensional object in which a three-dimensional object can be produced at high speed.

The present invention is a three-dimensional object producing method, and a corresponding apparatus, of the type in which a beam is irradiated on a liquid surface of a liquid photo-curable resin to form a succession of cured resin layers corresponding to successive cross-sectional laminae of the three-dimensional object and step-wise moving the cured resin layers as they are formed to build up a three-dimensional copy of object, wherein the improvement of the method comprises the steps of:

(a) vector-scanning the beam on a first layer of photo-curable resin along one or more paths corresponding to the contour or contours of a first one of the cross-sectional laminae of the object;

(b) thereafter, raster-scanning the beam on one or more layers of photo-curable resin which are subsequent to the first layer of photo-curable resin; and (c) repeating steps (a) and (b) until a complete copy of the object is thereby produced.

The above, and other objects, features and advantages of the present invention, will become apparent in the following detailed description of a preferred embodiment when read in conjunction with the accompanying drawings, in which like reference numerals are used to identify the same or similar parts in the several views.

BRIEF DESCRIPTION OF THE DRAWINGS

FIGS. 3 to 5 are diagrams showing an example of an apparatus which embodies a method for producing a three-dimensional object according to the present invention wherein:

DETAILED DESCRIPTION OF A PREFERRED EMBODIMENT

The present invention will hereinafter be described in detail with reference to the drawings.

Let us first describe an example of an apparatus which embodies a method for producing a three-dimensional object according to the present invention. Then, let us describe the method of the present invention which utilizes the above-described apparatus.

Figure 3:
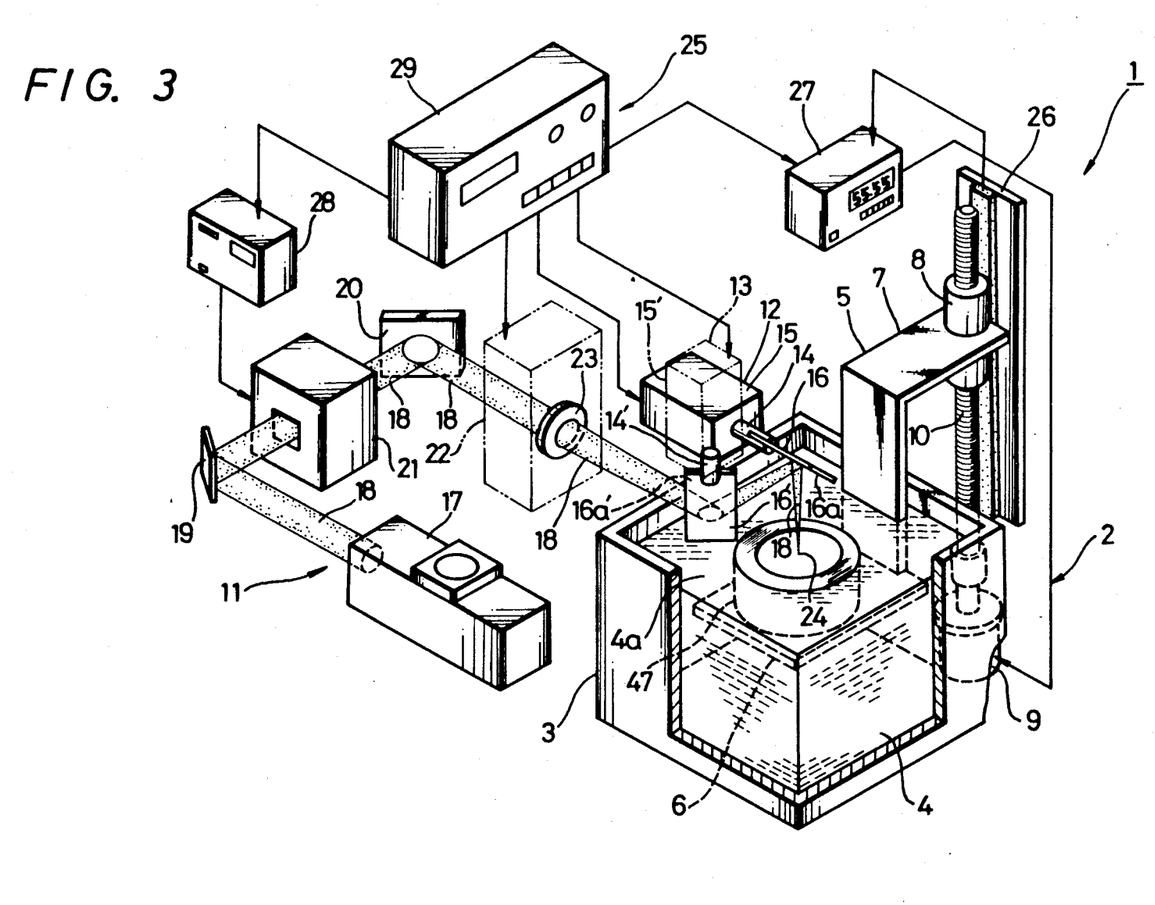
FIG. 3 is a perspective view of the three-dimensional object producing apparatus and illustrating the same in a partly cut-away fashion.
Figure 4:
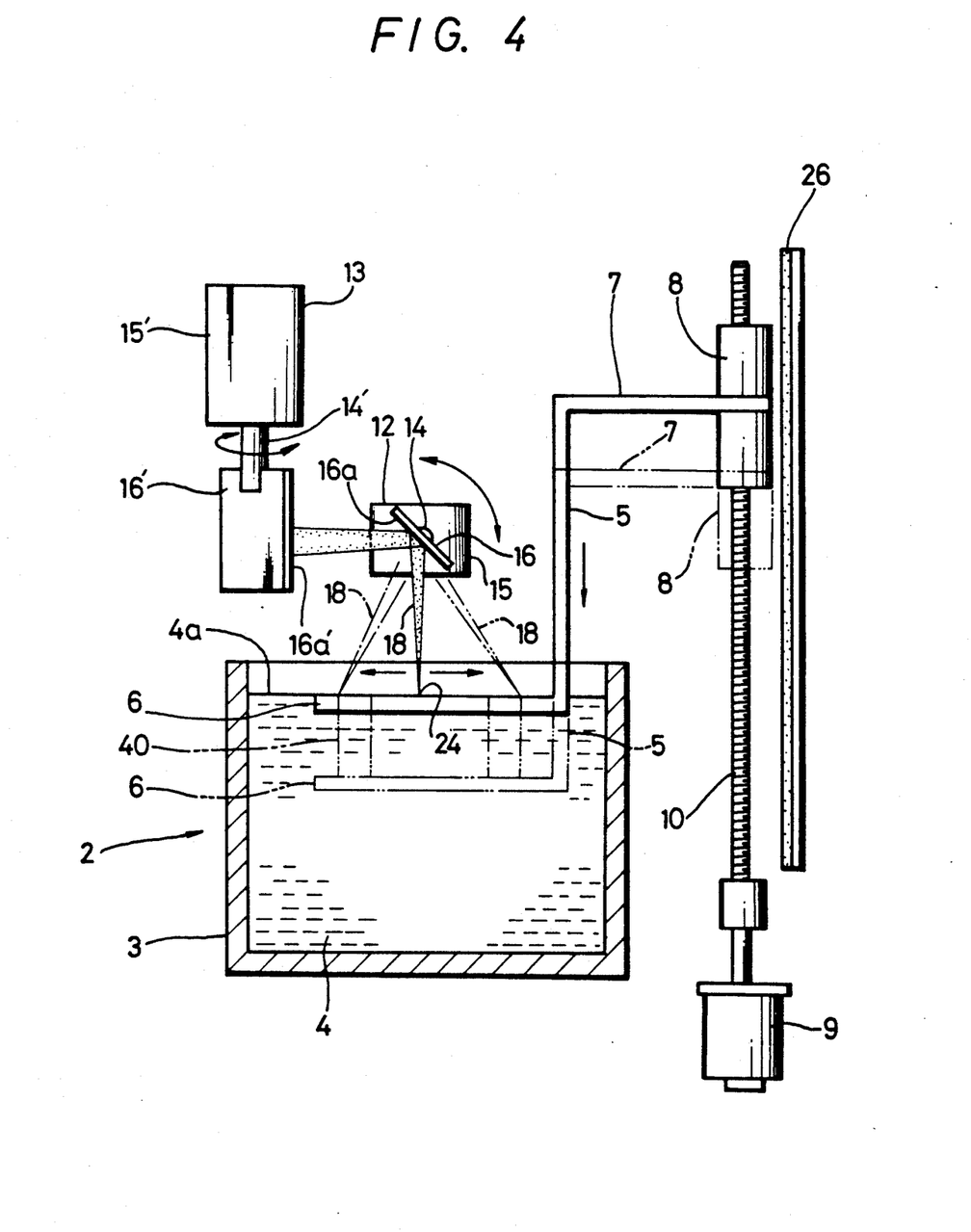
FIG. 4 is a fragmentary, cut-away front view showing a work section of the apparatus.
Figure 5:
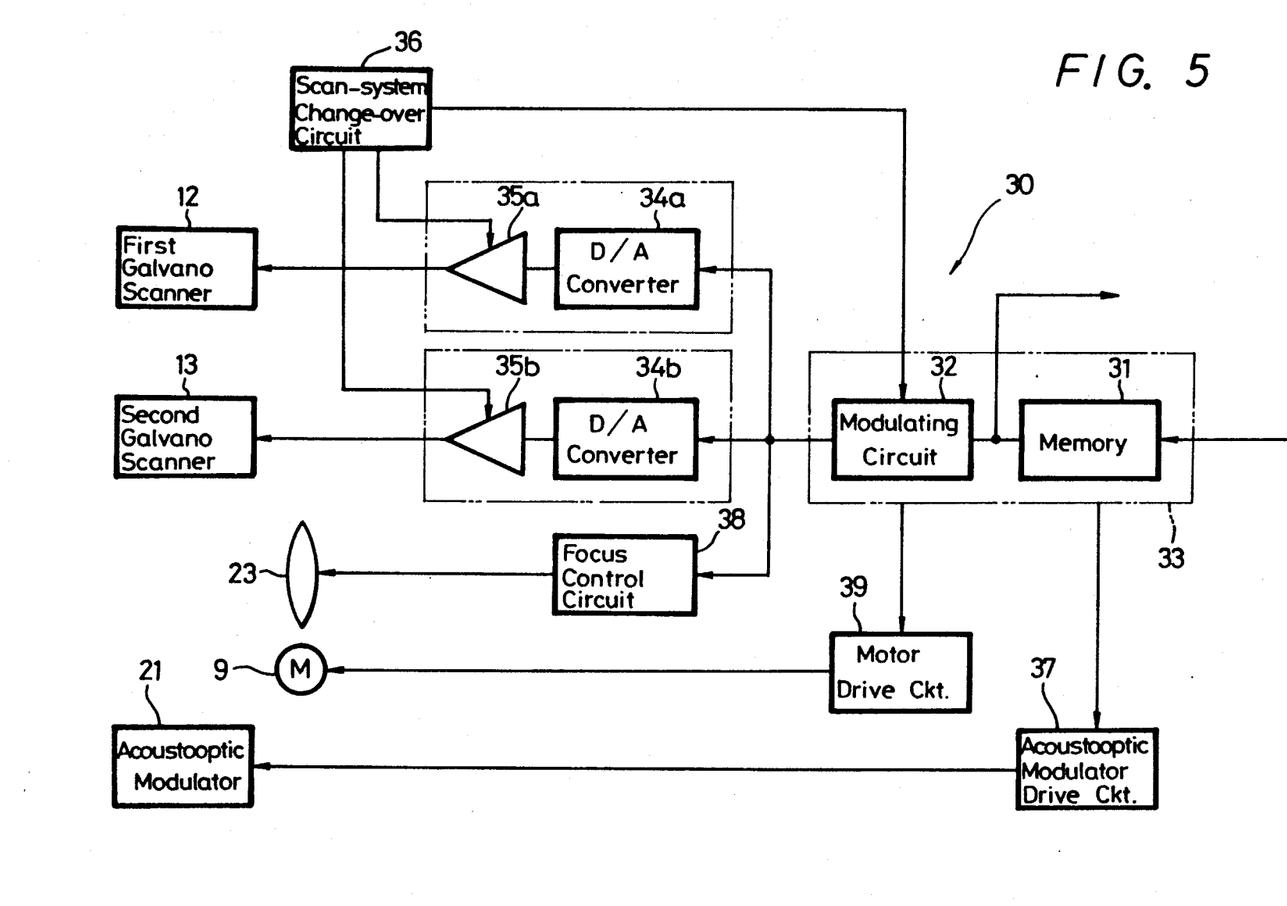
FIG. 5 is a block diagram showing a circuit of a control section of the apparatus.

Referring to FIGS. 3 to 5, there is provided a three-dimensional object producing apparatus which is depicted by reference numeral 1. The three-dimensional object producing apparatus 1 is comprised of a work section having a resin storage tank in which a liquid photo-curable resin is stored, an elevator and the like, a beam scanning section for causing an exposure beam to scan a liquid surface of the liquid photo-curable resin and a control section for controlling the operations of the work section and the beam scanning section.

As shown in FIGS. 3 and 4, there is provided a work section 2 which provides a resin storage tank 3 to store therein a liquid photo-curable resin 4.

The liquid photo-curable resin 4 is presented in the form of a liquid which can be cured by the irradiation of a predetermined exposure beam. Further, the liquid photo-curable resin 4 is requested to have a bonding property so that, when cured on the surface of the already-cured portion, it may be stuck to the above-mentioned surface. Also, it is preferable that the viscosity of this liquid photo-curable resin 4 is as low as possible. As the liquid photo-curable resin 4, it is possible to use, for example, a UV-curable denatured acrylate.

In FIGS. 3 and 4, reference numeral 5 designates an elevator which is comprised of a horizontal, plate-shaped stage 6 located at the lower end thereof. Further, in the elevator 5, a nut 8 is secured to an upper end 7 thereof and the nut 8 is engaged with a feed screw 10 rotated by a stepping motor 9 so that, when the feed screw 10 is rotated by the stepping motor 9, the nut 8 is moved along the feed screw 10 in its axial direction, thereby the elevator 5 being moved up and down.

The above-mentioned elevator 5 is located such that the stage 6 thereof is kept in the liquid photo-curable resin 4 stored in the resin storage tank 3. The elevator 5 is also movable step by step at a predetermined pitch.

A beam scanning section, generally designated by reference numeral 11 in FIGS. 3 and 4, will be described with reference to FIGS. 3 and 4.

Referring to FIGS. 3 and 4, the beam scanning section 11 includes a galvano scanner 12 which deflects an exposure laser beam, emitted from a laser beam oscillator which will be explained later, to the left and right direction in FIG. 4 (this direction will hereinunder be referred to as "first scanning direction") relative to a liquid surface 4a of the liquid photo-curable resin 4. Further, the beam scanning section 11 includes another galvano scanner 13 which deflects the exposure beam in the direction (this direction will hereinafter be referred to as "second scanning direction") perpendicular to the first scanning direction. These galvano scanners 12 and 13 are comprised of drive sections 15, 15' having rotary shafts 14, 14' rotatable around their axes at high speed and galvano mirrors 16, 16' secured to the rotary shafts 14, 14'.

In one galvano scanner of these two galvano scanners 12 and 13, i.e., the galvano scanner 12 (this galvano scanner 12 will hereinafter be referred to as a "first galvano scanner"), the axial direction of the rotary shaft 14 thereof is extended in the direction parallel to the second scanning direction, and also the galvano mirror 16 thereof is located substantially right over the stage 6 of the elevator 5. In the other galvano scanner 13 (this galvano scanner 13 will hereinafter be referred to as a "second galvano scanner"), the axial direction of the rotary shaft 14' thereof is extended along the up and down direction, and a reflection surface 16a' of the galvano mirror 16' thereof is faced to the reflection surface 16a of the galvano mirror 16 of the first galvano scanner 12 in the lateral direction.

Referring to FIGS. 3 and 4, there is provided a laser beam oscillator 17 which emits a predetermined exposure laser beam 18, for example, an argon ion laser beam having a wavelength of, for example, 360 nanometers or a helium cadmium laser beam having a wavelength of 325 nanometers. The laser beam 18 emitted from the laser beam oscillator 17 is totally reflected in sequence in a predetermined direction by total reflection mirrors 19 and 20 so that it may become incident upon the galvano mirror 16' of the second galvano scanner 13. An acoustooptic (A/O) modulator 21 is provided between the two total reflection mirrors 19 and 20, and a focus controller 22 having a focusing lens 23 is provided between the total reflection mirror 20 and the second galvano scanner 13.

Accordingly, the exposure laser beam 18 emitted from the laser beam oscillator 17 is totally reflected toward the acoustooptic modulator 21 by the total reflection mirror 19 and is controlled to travel through a predetermined light path thereafter by the ON-OFF control of a switching operation in the acoustooptic modulator 21. Thus, when the switching operation of the acoustooptic modulator 21 is in its ON state, the exposure laser beam 18 becomes incident upon the total reflection mirror 20 and is then reflected toward the focusing lens 23 of the focus controller 22. When the exposure laser beam 18 passes the focusing lens 23, a bundle of light thereof is focused or converged and sequentially reflected by the two galvano mirrors 16' and 16, thereby the exposure laser beam 18 being introduced upon the liquid photo-curable resin 4 from above. The exposure laser beam 18 is focused in a bundle of light by the focusing lens 23 so that it is always focused on the liquid surface 4a of the liquid photo-curable resin 4 as a beam spot 24 of a predetermined beam diameter. Further, when the rotary shaft 14 of the first galvano scanner 12 is rotated to swing the galvano mirror 16, the exposure laser beam 18 scans the liquid surface 4a of the liquid photo-curable resin 4 in the first scanning direction. Whereas, when the rotary shaft 14' of the second galvano scanner 13 is rotated to swing the galvano mirror 16', the exposure laser beam 18 scans the liquid surface 4a of the liquid photo-curable resin 4 in the second scanning direction.

Therefore, each time the line scanning (this line scanning will hereinafter be referred to as "first line scanning") by the exposure laser beam 18 in the first scanning direction done only by swinging the first galvano mirror 16 is ended, the exposure laser beam 18 is irradiated while changing the position in the second scanning direction of the first line scanning by swinging the second galvano mirror 16'. Alternatively, each time a line scanning (this line scanning will hereinafter be referred to as "second line scanning") by the exposure laser beam 18 in the second scanning direction done only by swinging the second galvano mirror 16' is ended, the exposure laser beam 18 is irradiated while changing the position in the first scanning direction of the second line scanning by swinging the first galvano mirror 16, thereby the irradiation of laser beams being performed according to the raster-scanning system. Further, when the first galvano mirror 16 and the second galvano mirror 16' are both swung simultaneously, the irradiation of laser beams is performed according to the vector scanning system in which the scanning of the exposure laser beam 18 is performed with a directivity in the two dimensions.

As shown in FIGS. 3 to 5, there is provided a control section 25. An elevator position detecting sensor 26 is located in parallel to the above-described feed screw 10 so as to detect the position of the elevator 5. An elevator controller 27 is supplied with a signal indicative of the position of the elevator 5 from the sensor 26 and controls the revolution of the stepping motor 9 in accordance with this signal, thereby the position of the elevator 5 being controlled.

An acoustooptic modulator controller 28 controls the switching operation of the acoustooptic modulator 21. A galvano controller 29 controls the operations of acoustooptic modulator 28, the galvano scanners 12, 13 and the focus controller 22 by the commands thereof.

A circuit, generally designated by reference numeral 30 in FIG. 5, is provided in association with the above-described control section 25.

Referring to FIG. 5, a memory 31 is connected to a three-dimensional object programming apparatus (not shown) such as a so-called computer-aided design (CAD) or the like. The memory 31 is supplied with pixel signals exploded by the X and Y directions of the exploded plane of a certain or desired three-dimensional object image designed by the three-dimensional object programming apparatus and temporarily stores these pixel signals.

A modulator circuit 32 is connected to the memory 31 and modulates the pixel signals of the exploded plane temporarily stored in the memory 31 into coordinate signals indicating a raster, i.e., the position whereat the exposure laser beam 18 scans the scanning region of the liquid surface 4a of the liquid photo-curable resin 4. A beam position control circuit 33 includes the memory 31 and the modulator circuit 32.

Digital-to-analog (D/A) converter circuits 34a and 34b are connected to the modulator circuit 32, and gate circuits 35a and 35b are respectively connected at their inputs to the D/A converters 34a and 34b and also connected at their outputs to the first and second galvano scanners 12 and 13. Of the coordinate signals modulated by the modulator circuit 32, the signal in the X direction, i.e., the signal in the first scanning direction is converted to an analog signal by the D/A converter circuit 34a and is supplied through the gate circuit 35a to the drive section 15 of the first galvano scanner 12. The coordinate signal in the Y direction, i.e., the second scanning direction is converted to an analog signal by the D/A converter circuit 34b and is then supplied through the gate circuit 35b to the drive section 15' of the second galvano scanner 13. The drive sections 15 and 15' swing the galvano mirrors 16 and 16' during the period in which they are supplied with the input signals, respectively.

A scanning system change-over circuit 36 is connected to the gate circuits 35a, 35b and the modulator circuit 32. This scanning system change-over circuit 36 changes over the scanning system of the beam spot 24 of the exposure laser beam 18 either to the raster-scanning system or to the vector-scanning system. In the case of the raster-scanning system, the scanning system change-over circuit 36 changes-over the main scanning direction, i.e., the line scanning direction either to a first scanning direction or to a second scanning direction by changing the sequencing of when the gates 34a and 34b are opened, as will be explained hereafter in further detail. The scanning system change-over circuit 36 also allows the scanning system to be alternately changed-over to the vector-scanning mode or the raster-scanning mode.

The irradiation of exposure laser beam 18 according to the vector-scanning mode is carried out only on the pixel signal of a configuration line of the corresponding cross-sectional lamina of the object to be reproduced. Consequently, in that case, of the pixel signals inputted to the memory 31, only data forming the configuration line is supplied to the modulator circuit 32.

Therefore, the gate circuits 35a and 35b are opened and/or closed by the command signal issued from the scanning system change-over circuit 36. When the scanning system is in the vector-scanning mode, the two gate circuits 35a and/or 35b are opened at all times. Whereas, when the scanning system is scanning in the first raster scanning direction, the gate circuit 35b is momentarily opened (to allow the signal to pass) each time the scanning of one scanning line in the first scanning direction is completed, thereby slightly rotating the galvano mirror 16' of the second galvano scanner 13 so that the line position of the line scanning of the exposure laser beam 18 is moved to the adjacent line in the second scanning direction. Further, when the scanning system is scanning in the second raster scanning direction, the gate circuit 35a is momentarily opened each time the scanning of one scanning line in the second scanning direction is completed, thereby slightly rotating the galvano mirror 16 of the first galvano scanner 12 so that the line position of the line scanning of the exposure laser beam 18 is moved to the adjacent line in the first scanning direction.

An acoustooptic modulator drive circuit 37 operates under the control of the beam position control circuit 33 and supplies the acoustooptic modulator 21 with a control signal corresponding to the existence or non-existence of the signal on one line in the X direction or on one line in the Y direction of plane data. Accordingly, the light path in which the exposure laser beam 18 emitted from the laser beam oscillator 17 travels from the acoustooptic modulator 21 is turned ON and/or OFF under the control of the acoustooptic modulator drive circuit 37.

A focus control circuit 38 is provided to control the position of the focusing lens 23 in the focusing direction such that the exposure laser beam 18 may always be focused on the liquid surface 4a of the liquid photo-curable resin 4 as a beam spot of a predetermined beam diameter.

A motor drive circuit 39 generates a command signal to drive the aforementioned stepping motor 9 on the basis of the signal from the beam position control circuit 33. When the operation in which the three-dimensional object is produced is started, the elevator 5 is moved such that the stage 6 thereof is located at the position lower than the liquid surface 4a of the liquid photo-curable resin 4 by a pitch of one layer, i.e., at the position lower than the liquid surface 4a by a pitch of a cross-sectional lamina when the three-dimensional object image is cross-sectioned into a plurality of cross-sectional liminae. The above-described position will hereinafter be referred to as "initial position". Further, after the above-described producing operation of the three-dimensional object is started, the elevator 5 is moved downwards by the pitch of one layer each time the beam scanning on one cross-sectional lamina is finished.

The above-described layer pitch is determined to be less than one-half of the thickness of the cured layer provided when the liquid photo-curable resin 4 is cured by the irradiation of the exposure laser beam 18. For example, when the exposure laser beam 18 is irradiated on the liquid surface 4a of the liquid photo-curable resin 4 so that the liquid photo-curable resin 4 is cured to have a thickness of about 0.5 to 0.7 mm from the liquid surface 4a thereof, the layer pitch is selected to fall in a range of from about 0.2 to 0.3 mm.

The three-dimensional object is produced by utilizing the above-described three-dimensional object producing apparatus 1 as follows.

In that case, a designed three-dimensional object image 47 (see FIG. 3) is a thick cylinder in shape.

When the three-dimensional image producing operation is started, the elevator 5 is moved to the initial position and the liquid photo-curable resin 4 having the thickness of one layer pitch is located on the top surface of the stage 6 of the elevator 5.

Under this condition, the exposure laser beam 18 scans the liquid surface 4a of the liquid photo-curable resin 4 at its region corresponding to the stage 6. The scanning of the exposure laser beam 18 is performed on the whole region or one portion of each cross-sectional lamina of the corresponding three-dimensional object. Also, the scanning is sequentially performed from either one of two cross-sectional laminae at the respective ends in the direction normal to the exploded planes. Further, the scanning on one cross-sectional lamina is performed either by the vector-scanning system (this will hereinafter be referred to as "configuration scanning") with a pattern corresponding to the configuration line of the corresponding cross-sectional lamina or by the raster-scanning system (this will hereinafter be referred to as "field or plane scanning") with a pattern corresponding to the whole region of the corresponding cross-sectional lamina. Simultaneously, the configuration scanning and the field scanning are alternately changed-over and performed at every layer. Also, the field scanning is performed such that the first raster scanning and the second raster scanning are alternately changed-over.

Figure 9:
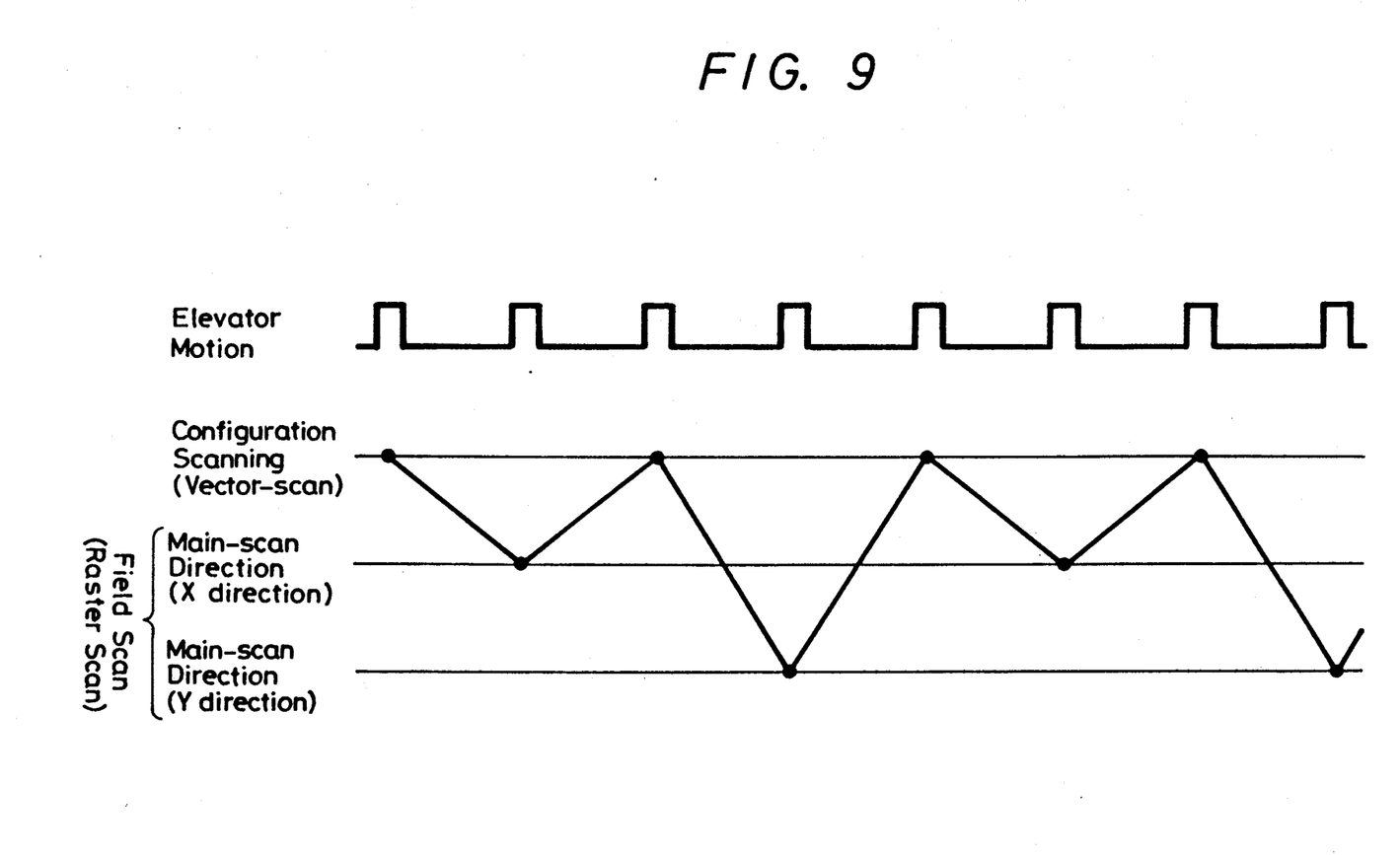
FIG. 9 is a timing chart to which reference will be made in explaining a switching operation of beam scanning systems.

FIG. 9 is a timing chart to which reference will be made in explaining the switching operation of the scanning systems.

Figure 6A:
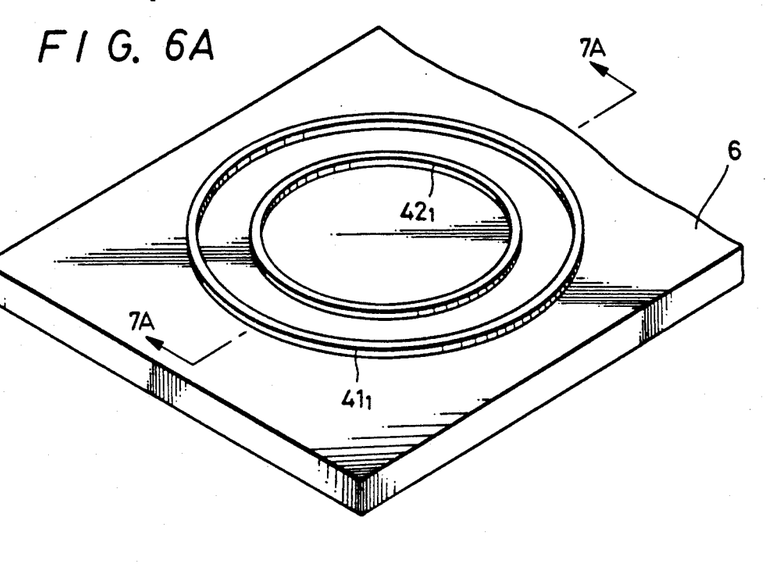
FIG. 6A is a perspective, diagrammatic view of a first step in the process of the invention showing a first photo-cured layer of resin after having been subjected to vector-scanning of a radiation beam along one or more paths corresponding to the contour or contours of a first cross-sectional laminae of the object to be reproduced by the process.
Figure 7A:
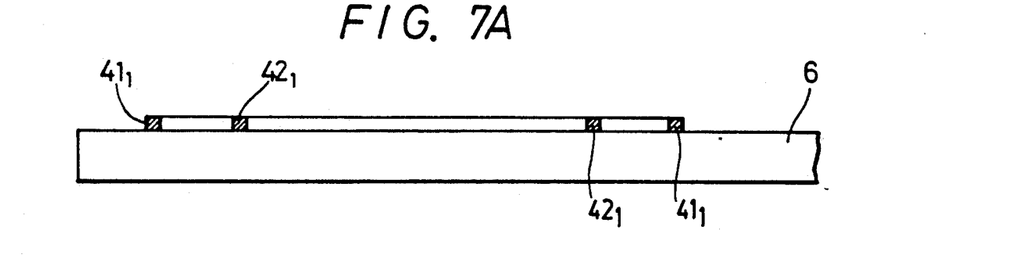
FIGS. 7A, 7B, 7C and 7D are vertical cross-sections of the FIGS. 6A, 6B, 6C and 6D, respectively, taken generally along the lines 7A—7A, 7B—7B, 7C—7C, and 7D—7D, respectively.

From the condition that the elevator 5 is moved to the the initial position, the configuration scanning is performed on the first cross-sectional lamina, whereby the scanning of the exposure laser beam 18 is performed with a pattern corresponding to the configuration line of the first cross-sectional lamina, i.e., a pattern corresponding to the outer peripheral line and the inner peripheral line according to the vector-scanning system. Therefore, as shown in FIG. 6A and FIG. 7A, an annular cured stripe $41_1$ defining the outer periphery of the first cross-sectional and an annular cured stripe $42_1$ for defining the inner periphery of the first cross-sectional lamina are formed on the stage 6 of the elevator 5, whereas the liquid photo-curable resin 4 existing between the cured stripes $41_1$ and $42_1$ is not cured and left as it is.

When the configuration scanning is finished, the elevator 5 is moved downwards by one layer pitch, whereby the liquid photo-curable resin 4 having a thickness of one layer pitch is flowed onto the cured stripes $41_1$ and $42_1$ and the non-cured portion.

Figure 6B:
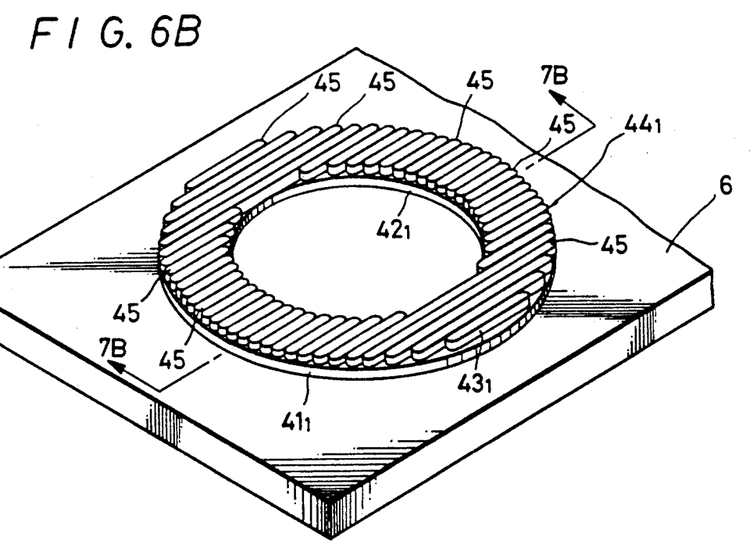
FIG. 6B is a perspective, diagrammatic view of a second step in the process of the invention showing a second photo-cured layer of resin, which is deposited subsequent to the layer of photo-curable resin depicted in FIG. 6A, after having been subjected to raster-scanning the beam in a first direction.
Figure 7B:
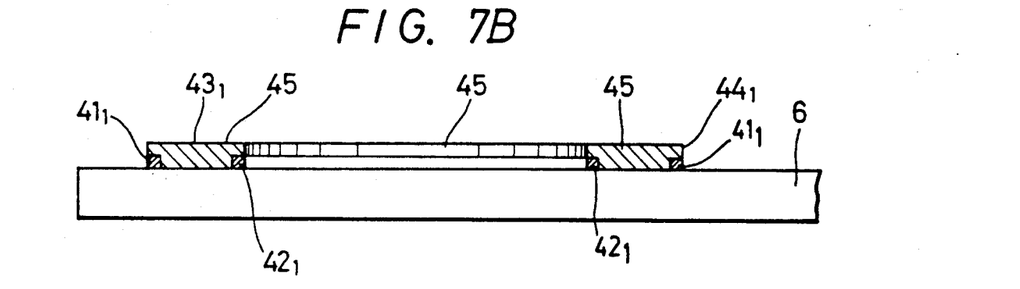

Under this condition, the field scanning of the exposure laser beam 18 is performed on the second exploded plane according to the first raster scanning system. In the first raster scanning system, the line scanning is performed by swinging the galvano mirror 16 of the first galvano scanner 12. Each time one line scanning is ended, the galvano mirror 16' of the second galvano scanner 13 is rotated by an angle equivalent to one line pitch, thereby the position of the line scanning being sequentially moved towards the second scanning direction so that the irradiation of the exposure laser beam 18 is performed so as to define the cross-sectional lamina from a plane standpoint. At that time, the region in which the liquid photo-curable resin 4 is not yet cured because the irradiation of the exposure laser beam 18 is not performed on the first cross-sectional limina, i.e., the liquid photo-curable resin 4 existing in the region between the annular cured stripes $41_1$ and $42_1$ is also cured by the irradiation of the exposure laser beam 18 with the result that the liquid photo-curable resin 4 is simultaneously cured. Therefore, as shown in FIGS. 6B and 7B, a substantially sheet-shaped cured resin layer $43_1$ having a thickness corresponding to a pitch of two layers is produced.

When the above-described cured resin layer $43_1$ is formed, the annular cured stripes $41_1$ and $41_2$ are bonded to the cured resin layer $43_1$, thereby producing a composite cured resin layer $44_1$ having substantially the same shape as those of the first and second cross-sectional laminae.

Figure 6C:
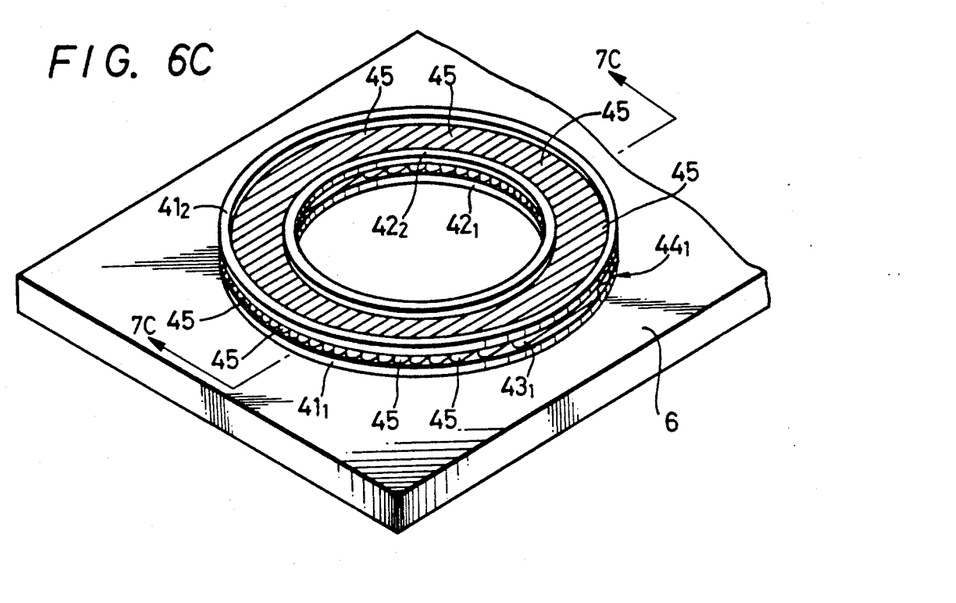
FIG. 6C is a perspective, diagrammatic view of a third step in the process of the invention showing a third photo-cured layer of resin, which is deposited on top of the second layer depicted in FIG. 6B, after having been subjected to vector-scanning of a radiation beam along one or more paths corresponding to the contour or contours of a third cross-sectional laminae of the object to be reproduced by the process.
Figure 6D:
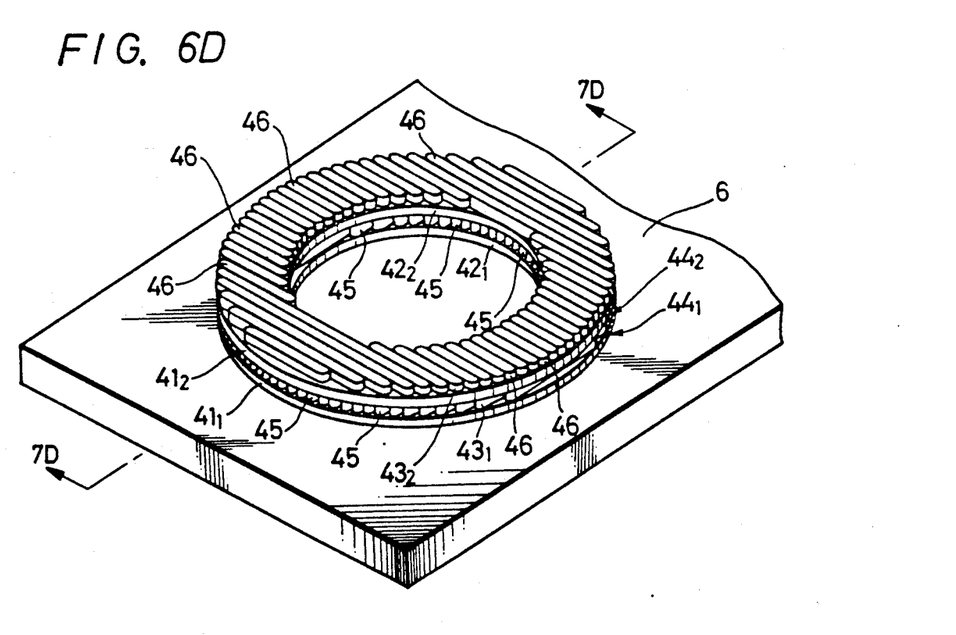
FIG. 6D is a perspective, diagrammatic view of a fourth step in the process of the invention showing a fourth photo-cured layer of resin, which is deposited subsequent to the layer of photo-curable resin depicted in FIG. 6C, after having been subjected to raster-scanning the beam in a second direction.
Figure 7C:
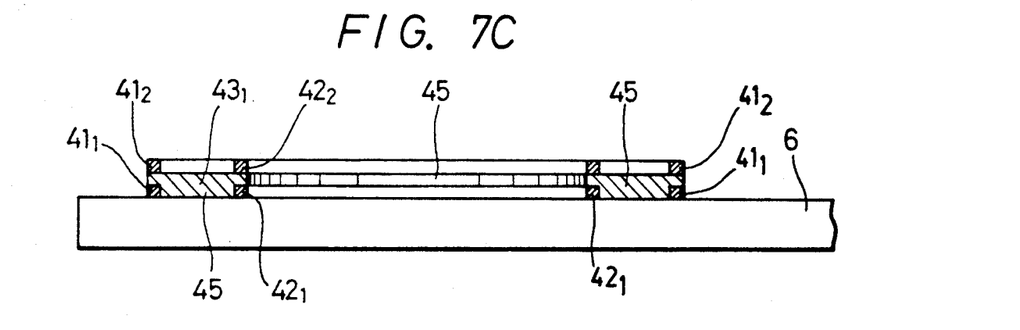
Figure 7D:
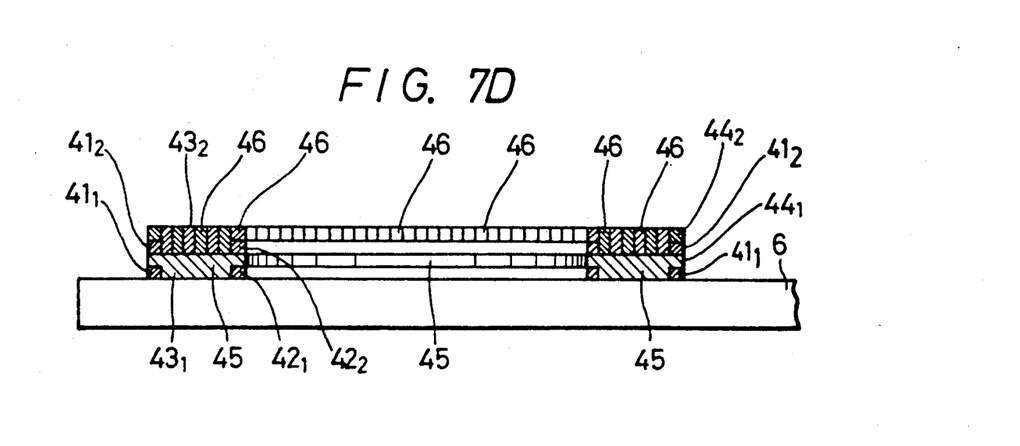
Figure 8:
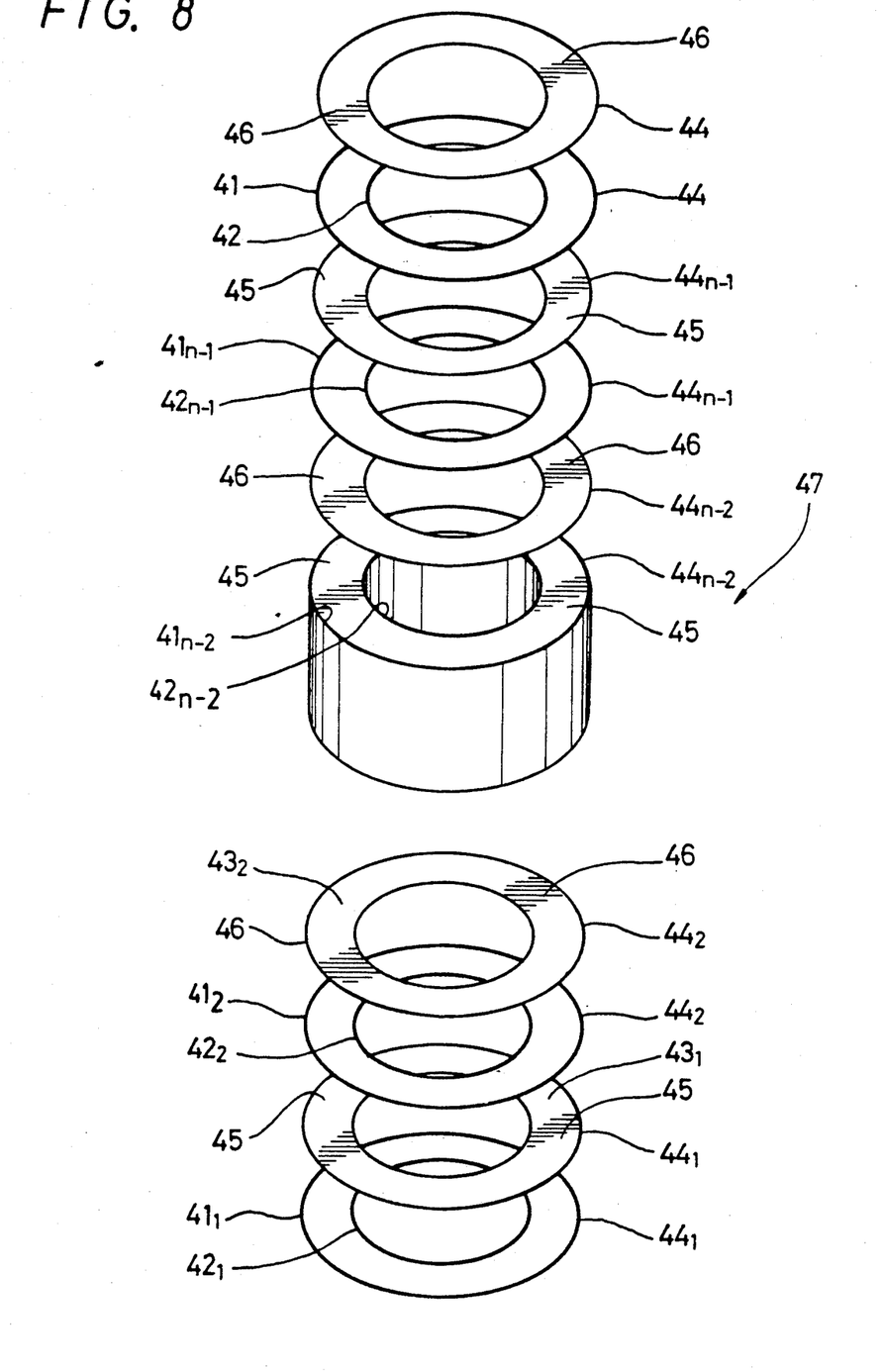
FIG. 8 is a conceptual diagram partly showing the thus formed three-dimensional object in the separated form of each cured-resin layer.

In FIGS. 6 and 7, reference numerals 45, 45 . . . or 46, 46 . . . designate bar-shaped cured portions formed by one line scanning (in FIG. 8, one portion of the cured portions 45, 45 or 46, 46 is shown in the respective cured resin layers 43, 43 . . . by lines).

When the elevator 5 is moved downwards by one layer pitch, the liquid photo-curable resin 4 of amount corresponding to the thickness of one layer pitch is flowed onto the cured resin layer $43_1$, and the irradiation of the exposure laser beam 18 is performed on the third cross-sectional limina. This irradiation of the laser beam 18 is performed only on the configuration line of the third cross-sectional lamina according to the configuration scanning system. Therefore, as shown in FIGS. 6C and 7C, two annular cured stripes $41_2$ and $42_2$ are formed on the already-formed cured resin layer $43_1$. The cured stripes $41_2$ and $42_2$ are bonded to the composite cured resin layer $44_1$ and are unitarily formed therewith.

From this state, the elevator 5 is moved downwards by one layer pitch, and the irradiation of the exposure laser beam 18 is performed on a fourth cross-sectional limina according to the field scanning base on the second raster-scanning system. In the second raster-scanning system, the line scanning is performed by swinging the second galvano mirror 16'. Each time one line scanning is completed, the first galvano mirror 16 is rotated by the angle equivalent to one line pitch, thereby the position of the line scanning being sequentially moved towards the first scanning direction so that the irradiation of the exposure laser beam 18 is carried out so as to define the fourth cross-sectional limina from a plane standpoint. At that time, the region in which the liquid photo-curable resin 4 is not cured since the irradiation of the exposure laser beam 18 is not performed on the third cross-sectional limina, i.e., the region between the cured stripes $41_2$ and $42_2$ is simultaneously cured. Therefore, as shown in FIGS. 6D and 7D, a cured resin layer $43_2$ having a thickness corresponding to the pitch of two layers is formed. The cured stripes $41_2$ and $42_2$ are bonded to and unitarily formed with the cured resin layer $43_2$ when the cured resin layer $43_2$ is formed, thereby a composite cured resin layer $44_2$ having substantially the same shape as those of the third and fourth cross-sectional liminae being formed.

As further illustrated in FIG. 8, the above-described operation is repeatedly carried out, whereby a number of cured resin layers $43_1, 43_2, \ldots, 43_n$ are laminated on the stage 6 while leaving the cured stripes $41_1, 42_1, 41_2, 42_2, 41_n$ and $42_n$ thereamong, thereby forming a three-dimensional object 47 having the same shape of the three-dimensional object image 46.

Therefore, the surface of the thus formed three-dimensional object 47 can be made very smooth. In other words, the outer peripheral surface and the inner peripheral surface of the three-dimensional object 47 are formed of outer side surfaces of the cured stripes formed by the vector-scanning at the pitch of one layer so that, when seen on the whole, the surface of the three-dimensional object 47 can be made very smooth without irregularities at all.

In this embodiment, the line scanning direction of the raster-scanning system done by the pitch of one layer is alternately changed so that, when the cured stripes 45, 45, ... and 46, 46 ... are cured, the directions in which the cured stripes 45, 45, ... and 46, 46 ... are warped due to the contraction are not regular, thereby a three-dimensional object having no distortion being obtained.

Further, since the line scanning direction is changed at every other cured resin layer, the starting point and the ending point of the line scanning can be prevented from being produced only one side surface of the three-dimensional object, thus making it possible to obtain a three-dimensional object whose any side surface is smooth.

As is clear from the foregoing description, according to the method for producing a three-dimensional object of the present invention, the irradiation of beam is performed on the liquid surface of the liquid photo-curable resin to thereby from the cured resin layer having the pattern corresponding to the shape of the cross-sectional limina which results from repeatedly cross-sectioning, the three-dimensional object along one direction. In the next process, the liquid photo-curable resin is placed on the cured resin layer and the irradiation of beam is again performed on the liquid surface of the liquid photo-curable resin, thereby laminating the cured resin layer. Thus, the cured resin layer is sequentially laminated to form a desired three-dimensional object. One of the most specific features of the method of this invention is as follows:

The above-described beam irradiation is performed by the beam scanning section which is composed of beam oscillating means, acoustooptic modulating means, the first galvano mirror for deflecting the beam in one straight line direction on the cross-sectional limina and the second galvano mirror for deflecting the beam in the direction perpendicular to the above-mentioned straight line. Further, the scanning of the beam is performed by two kinds of scanning systems, i.e., the configuration scanning system in which the configuration line of the exploded plane is scanned by the vector-scanning system and the field-scanning system in which the whole surface of the exploded plane is scanned by the raster-scanning system. The configuration scanning is carried out each time the cured resin layer is formed by one or a plurality of the field-scannings.

Therefore, according to the method for producing a three-dimensional object of the present invention, of the laminated cured resin layers, the layer with its outward form being cured is formed on every other one or several cured resin layers by the configuration scanning based on the vector-scanning system, whereby the outward form of that cured resin layer can be made smooth. Thus, when the thus formed three-dimensional object is seen on the whole, the surface of the three-dimensional object can be made very smooth.

Further, since the beam switching control operation necessary for the beam scanning is performed by the acoustooptic modulating means whose control operation is performed at an electrical speed, the switching between the vector-scanning and the raster-scanning can be made at high speed and the scanning of beam can also be made at high speed, thereby the three-dimensional object being produced at high speed.

While the configuration scanning is performed at every other cured resin layer in the above-described embodiment, such a variant is also possible that the configuration scanning is performed at every cured resin layers of 2 or more formed by the field scanning.

The method for producing a three-dimensional object of the present invention is not limited to the apparatus which is constructed as in the above-mentioned embodiment. The apparatus described in the above-mentioned embodiment is described herein as an example of apparatus which can embody the method of the present invention.

Furthermore, it is needless to say that the kinds of the liquid photo-curable resin, the kinds of the exposure beam and the shape of the three-dimensional object are not limited to those of the aforementioned embodiment.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

We claim as our invention

1. A three-dimensional object producing method in which a beam is irradiated on a liquid surface of a liquid photocurable resin to form a succession of cured resin layers corresponding to successive cross-sectional laminae of a three-dimensional object and incrementally, lowering the cured resin layers below the liquid surface as they are formed to build up a three-dimensional copy of the object, wherein the improvement of the method comprises the steps of:
   (a) vector-scanning the beam on a first layer of photo-curable resin along one or more paths corresponding only to the contour or contours of a first one of the cross-sectional laminae of the object to thereby form a line or lines of cured resin in the shape of the contour or contours of a first one of the cross-sectional laminae of the object;
   (b) lowering the line or lines of cured resin formed in step (a) below the liquid surface by a distance corresponding to the thickness of one cross-sectional lamina of the three-dimensional object to thereby flow a layer of photo-curable liquid resin to cover the line or lines of cured resin;
   (c) thereafter, raster-scanning the beam on the layer of photo-curable resin formed in step (b); and
   (d) sequentially repeating steps (a) through (c) to thereby build a sequence of cured resin layers until a complete copy of the object is thereby produced.

2. The method according to claim 1, wherein the vector scanning is performed each time a curved resin layer is formed by one or a plurality of raster-scannings.

3. The method according to claim 1, wherein the raster-scanning is performed such that the scanning direction thereof is changed on each of the raster-scanned layers of photocurable resin.

4. The method according to claim 1, wherein the raster-scanning is performed such that the raster-scanning direction of the preceding raster-scanning and the raster-scanning direction of the next raster-scanning are different from each other.

5. The method according to claim 4, wherein the raster-scanning is performed such that the successive scanning directions thereof on the scanned layers of photo-curable resin are perpendicular to each other.

6. A three-dimensional object producing apparatus including means for irradiating a beam on a liquid surface of a liquid photo-curable resin to form a succession of cured resin layers corresponding to successive cross-sectional laminae of a three-dimensional object and means for incrementally lowering the cured resin layers below the liquid surface as they are formed to build up a three-dimensional copy of the object, the apparatus comprising:

(a) means for vector-scanning the beam on a first layer of photo-curable resin along one or more paths corresponding only to the contour or contours of a first one of the cross-sectional laminae of the object to thereby form a line or lines of cured resin in the shape of the contour or contours of a first one of the cross-sectional laminae of the object;

(b) means for lowering the line or lines of cured resin formed by the vector scanning means below the liquid surface by a distance corresponding to the thickness of one crosssectional lamina of the three-dimensional object to thereby flow a layer of photo-curable liquid resin to cover the line or lines of cured resin;

(c) means for thereafter raster-scanning the beam on the layer of photo-curable resin covering the line or lines of cured resin; and (d) wherein the vector-scanning means, the means for lowering, an the raster-scanning means operate repeatedly and sequentially until a complete copy of the object is thereby produced.

7. The apparatus according to claim 6, wherein the raster-scanning means is composed of first deflecting means for deflecting the beam in one straight line direction on the resin layer and second deflecting means for deflecting the beam in the direction perpendicular to the straight line direction.

8. The apparatus according to claim 7, further comprising beam oscillating means and an acoustooptic modulating means for turning ON and OFF the beam from the beam oscillating means.

* * * * *